US012731398B2

(12) United States Patent
Zhang et al.

(10) Patent No.: US 12,731,398 B2
(45) Date of Patent: Sep. 8, 2026

(54) DISPLAYING AN AUGMENTED REALITY ELEMENT LISTING SUPPLEMENTAL ITEMS ASSOCIATED WITH A DETECTED ITEM

(71) Applicant: Maplebear Inc., San Francisco, CA (US)

(72) Inventors: Chao Zhang, Sunnyvale, CA (US); Bo Han, Brampton (CA); Anton Danshin, Toronto (CA); Yixi Ouyang, Milpitas, CA (US); Michal Dobaczewski, San Diego, CA (US)

(73) Assignee: Maplebear Inc., San Francisco, CA (US)

( * ) Notice: Subject to any disclaimer, the term of this patent is extended or adjusted under 35 U.S.C. 154(b) by 115 days.

(21) Appl. No.: 18/753,870

(22) Filed: Jun. 25, 2024

(65) Prior Publication Data

US 2025/0391073 A1 Dec. 25, 2025

(51) Int. Cl.

*G06V 20/20* (2022.01)
*G06T 11/60* (2006.01)
*G06V 20/40* (2022.01)

(52) U.S. Cl.

CPC .............. *G06T 11/60* (2013.01); *G06V 20/20* (2022.01); *G06V 20/40* (2022.01); *G06T 2200/24* (2013.01)

(58) Field of Classification Search

None

See application file for complete search history.

(56) References Cited

U.S. PATENT DOCUMENTS

| | | | | |
|---|---|---|---|---|
| 2020/0302510 | A1* | 9/2020 | Chachek | G06V 20/52 |
| 2021/0133850 | A1* | 5/2021 | Ayush | G06N 3/08 |
| 2023/0196764 | A1* | 6/2023 | Wisnewski | G06V 10/25 382/103 |
| 2024/0013287 | A1 | 1/2024 | Shah et al. | |
| 2024/0119503 | A1 | 4/2024 | Haapoja et al. | |

OTHER PUBLICATIONS

PCT International Search Report and Written Opinion, PCT Application No. PCT/US2025/024150, May 30, 2025, 10 pages.

* cited by examiner

*Primary Examiner* — Nicholas R Wilson
(74) *Attorney, Agent, or Firm* — Fenwick & West LLP

(57) ABSTRACT

A client device or an online system communicating with the device receives video data captured by a camera of the device, in which the video data depicts a field of view of a display area of the device. The device/system detects an object within the field of view based on the video data and applies one or more machine-learning algorithms to identify the object as an item available at a source. The device/system accesses item data for items available at the source and selects one or more supplemental items associated with the identified item based on item data for the identified item and each supplemental item. The device/system generates an augmented reality element including a listing of the supplemental item(s), as well as information or a selectable option associated with each supplemental item. The augmented reality element is then displayed in the display area of the device.

18 Claims, 7 Drawing Sheets

DISPLAYING AN AUGMENTED REALITY ELEMENT LISTING SUPPLEMENTAL ITEMS ASSOCIATED WITH A DETECTED ITEM

BACKGROUND

Various types of items may be acquired from sources, such as warehouses, retailer locations, etc., in which similar types of items are often located near each other. For example, fresh fruits and vegetables may be located in a produce department of a grocery store retailer, in which similar types of items, such as different types of salad greens (e.g., spinach, kale, arugula, etc.) are located near each other. Furthermore, items that are commonly used together are also often located near each other. In the above example, since salad dressings are commonly paired with salad greens, salad dressings also may be located near the salad greens in the produce department. Additionally, various promotions may be available at a source. For example, a retailer may offer customers $5.00 off their next purchase if they purchase $20.00 or more in qualifying items (e.g., items of a particular brand).

However, those who visit sources may have negative experiences if they are unfamiliar with the sources or if they are unaware of promotions available at the sources. In the above example, a customer may be frustrated if they only become aware of the offer after they purchase $19.00 in qualifying items and they would have purchased $20.00 or more in qualifying items if they had known about the offer prior to making the purchase. As an additional example, if gluten-free items are located in an aisle labeled "specialty items" at a source, a customer looking for gluten-free pasta who has never shopped at the source may be unable to find the gluten-free pasta if they are looking for the pasta in other aisles (e.g., aisles labeled "pasta" or "pantry"). In this example, if the customer often purchases gluten-free pasta, they may never return to the source if they believe gluten-free pasta is not available at the source.

SUMMARY

In accordance with one or more aspects of the disclosure, an augmented reality element listing supplemental items associated with a detected item is displayed. More specifically, a client device, or an online system communicating with the client device, receives video data captured by a camera of the client device, in which the video data depicts a field of view of a display area of the client device. The client device/online system detects an object within the field of view based on the video data and applies one or more machine-learning algorithms to the video data to identify the object as an item available at a source. The client device/online system accesses item data for items available at the source and selects one or more supplemental items associated with the identified item based on a set of item data for the identified item and each supplemental item. The client device/online system generates an augmented reality element including a listing of the supplemental item(s), information associated with each supplemental item, or a selectable option associated with each supplemental item. The augmented reality element is then displayed in the display area of the client device, in which the augmented reality element is overlaid onto a portion of the display area based on a location within the field of view of the display area at which the item is detected.

DETAILED DESCRIPTION

Figure 1:
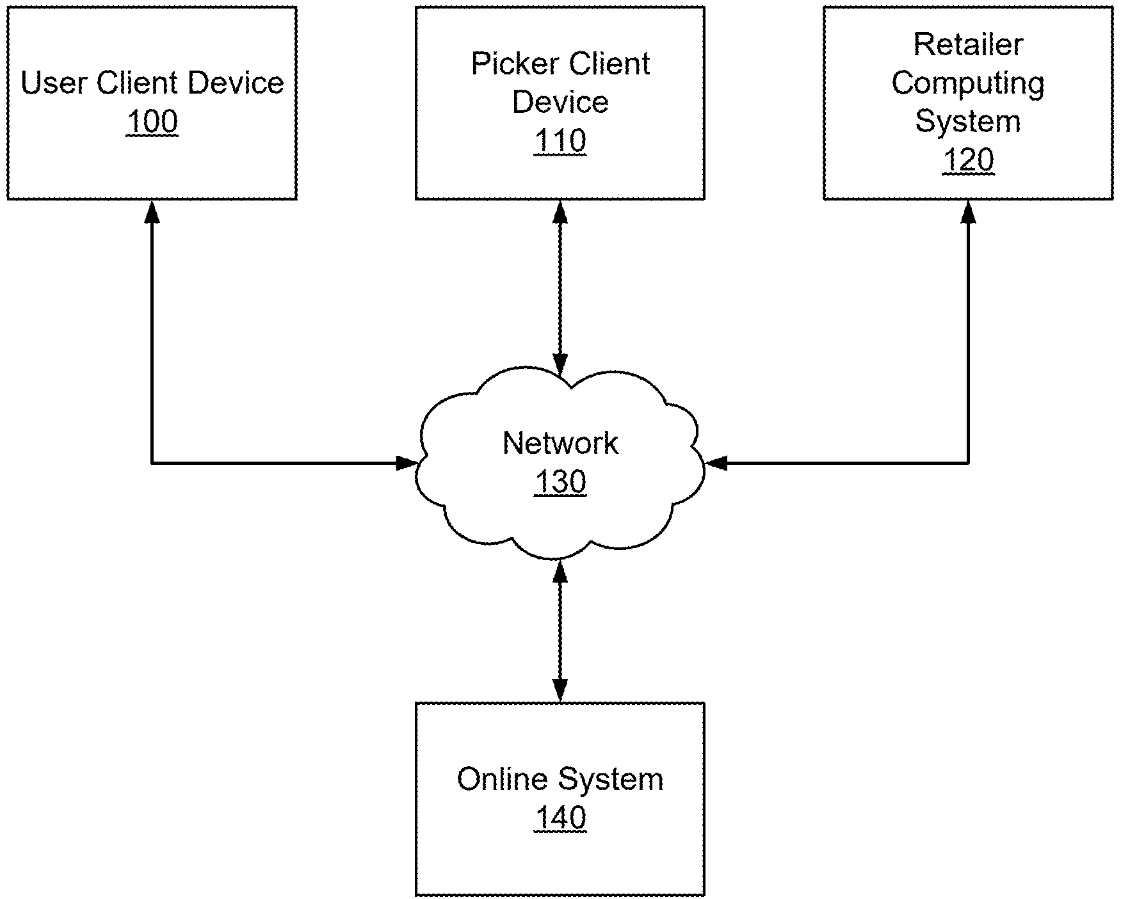
FIG. 1 illustrates an example system environment for an online system and a user client device, in accordance with one or more embodiments.

FIG. 1 illustrates an example system environment for an online system and a user client device, in accordance with one or more embodiments. The system environment illustrated in FIG. 1 includes a user client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online system 140. As such, there may be more than one user client device 100, picker client device 110, or retailer computing system 120.

The user client device 100 is a client device through which a user may interact with the picker client device 110, the retailer computing system 120, or the online system 140. The user client device 100 may be a personal or mobile computing device, such as a smartphone, a tablet, a laptop computer, or a desktop computer. The user client device 100 also may be an augmented reality device or a mixed reality device that integrates digital elements (e.g., visual, audio, haptic, etc.) with a user's environment in real time. The user client device 100 also may be a personal or mobile computing device having the capabilities of an augmented or mixed reality device. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, refers to a good or product that may be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user may use to place an order with the online system 140. The ordering interface may be part of a client application operating on the user client device 100. The ordering interface allows the user to search for items that are available through the online system 140 and the user may select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the items should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call. The user client device 100 is described in further detail below with regards to FIG. 2B.

The picker client device 110 is a client device through which a picker may interact with the user client device 100, the retailer computing system 120, or the online system 140. The picker client device 110 may be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer location or other source. The picker client device 110 presents the items that are included in the user's order to the picker in a collection interface. The collection interface is a user interface that provides information to the picker identifying items to collect for a user's order and the quantities of the items. In some embodiments, the collection interface provides multiple orders from multiple users for the picker to service at the same time from the same source. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker may use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in a source to receive the weight of an item.

When the picker has collected all of the items for an order, the picker client device 110 provides instructions to a picker for delivering the items for a user's order. For example, the picker client device 110 displays a delivery location from the order to the picker. The picker client device 110 also provides navigation instructions for the picker to travel from the retailer location or other source to the delivery location. When a picker is servicing more than one order, the picker client device 110 identifies which items should be delivered to which delivery location. The picker client device 110 may provide navigation instructions from the source to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location or other source and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the source. In these embodiments, each person may have a picker client device 110 that they can use to interact with the online system 140. Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online system 140. As used herein, a "retailer" is an entity that operates a "source," which is a retailer location, a store, a warehouse, a building, or other location from which a picker can collect items or from which a user may order or purchase items. The retailer computing system 120 stores and provides item data to the online system 140 and may regularly update the online system 140 with updated item data. For example, the retailer computing system 120 provides item data indicating which items are available at a particular retailer location and the quantities of those items. Additionally, the retailer computing system 120 may transmit updated item data to the online system 140 when an item is no longer available at the retailer location. Furthermore, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The user client device 100, the picker client device 110, the retailer computing system 120, and the online system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which users can order items to be provided to them by a picker from a retailer. The online system 140 receives orders from a user client device 100 through the network 130. The online system 140 selects a picker to service the user's order and transmits the order to a picker client device 110 associated with the picker. The picker collects the ordered items from a retailer location or other source and delivers the ordered items to the user. The online system 140 may charge a user for the order and provide portions of the payment from the user to the picker and the retailer. As an example, the online system 140 may allow a user to order groceries from a grocery store retailer. The user's order may specify which groceries they want delivered from the grocery store and the quantities of each of the groceries. The user's client device 100 transmits the user's order to the online system 140 and the online system 140 selects a picker to travel to the grocery store retailer location to collect the groceries ordered by the user. Once the picker has collected the groceries ordered by the user, the picker delivers the groceries to a location transmitted to the picker client device 110 by the online system 140. The online system 140 is described in further detail below with regards to FIG. 2A.

Figure 2A:
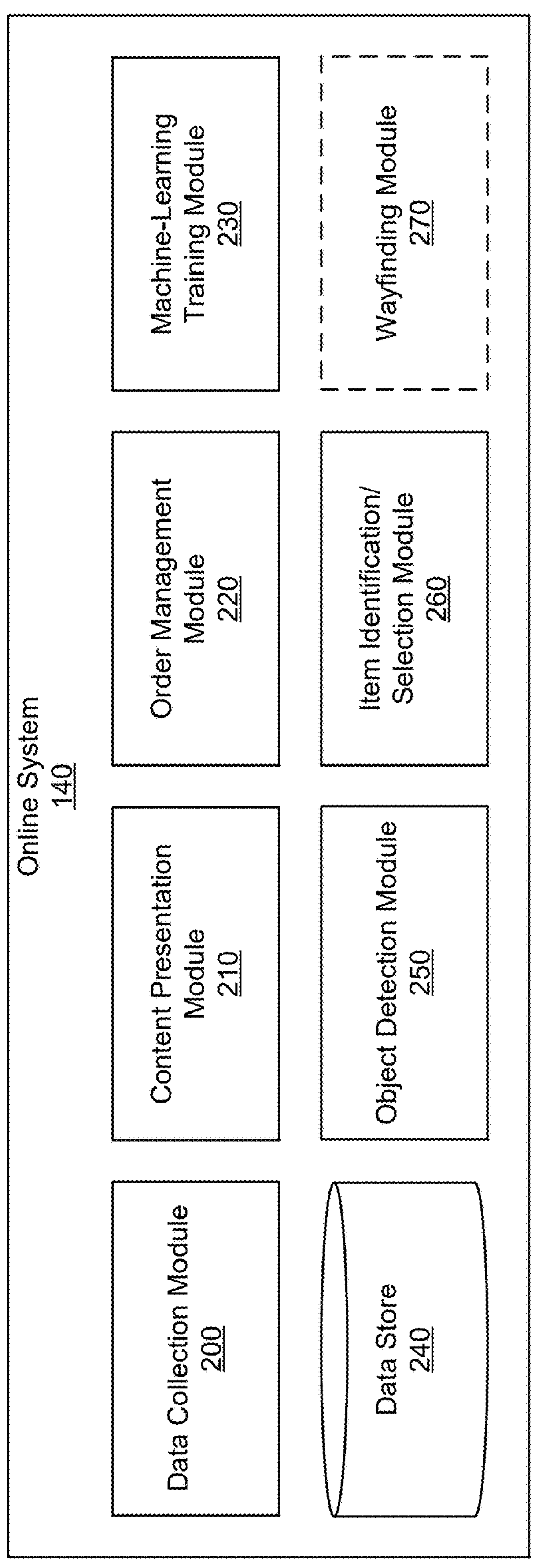
FIG. 2A illustrates an example system architecture for an online system, in accordance with one or more embodiments.

FIG. 2A illustrates an example system architecture for an online system 140, in accordance with some embodiments. The system architecture illustrated in FIG. 2A includes a data collection module 200, a content presentation module 210, an order management module 220, a machine-learning training module 230, a data store 240, an object detection module 250, and an item identification/selection module 260. In some embodiments, the system architecture also includes a wayfinding module 270. Alternative embodiments may include more, fewer, or different components from those illustrated in FIG. 2A, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

The data collection module 200 collects user data, which is information or data describing characteristics of a user. User data may include a user's name, address, shopping preferences, favorite items, or stored payment instruments. The user data also may include default settings established by the user, such as a default retailer/source, payment instrument, delivery location, or delivery timeframe. The user data also may include historical information (e.g., historical conversion information) associated with a user. For example, the user data may include information describing previous orders placed by the user with the online system 140 or previous purchases made by the user from one or more sources, items included in each order/purchase, a date of each order/purchase, any promotions (e.g., offers, rewards, discounts, coupons, etc.) associated with each order/purchase, etc. The user data also may include information describing a location, an orientation, an elevation, etc. of a user client device 100 associated with a user. For example, the user data may include GPS coordinates associated with the user client device 100 and a time (e.g., a timestamp) during which the user client device 100 was associated with the coordinates. In the above example, the user data also may describe a direction the user client device 100 is facing (e.g., a cardinal direction) and an elevation of the user client device 100. The data collection module 200 may use sensor data from the user client device 100 or from sensors in a source to determine the location, orientation, elevation, etc. of the user client device 100 within the source. The data collection module 200 may collect the user data from sensors on the user client device 100 or based on the user's interactions with the online system 140. The data collection module 200 also may collect the user data from a retailer computing system 120.

The data collection module 200 also collects item data, which is information or data identifying and describing items that are available at a source, such as a retailer location. The item data may include item identifiers for items that are available and may include quantities of items associated with each item identifier. Additionally, item data may also include attributes of items such as the sizes, colors, weights, stock keeping units (SKUs), serial numbers, prices, item categories, brands, qualities (e.g., freshness, ripeness, etc.), ingredients, materials, manufacturing locations, versions/varieties (e.g., flavors, low fat, gluten-free, organic, etc.), availabilities/seasonalities, or any other suitable attributes of the items. The item data also may include information describing locations of items within a source. For example, item data for an item may include information describing an aisle number and a shelf within a source at which the item is located. In some embodiments, information describing a location of an item within a source includes a layout of the source that describes an arrangement of aisles, departments, display tables or cases, etc. at the source. In the above example, the aisle and shelf may be indicated on an image corresponding to a layout of the source. The item data may further include purchasing rules associated with each item, if they exist. For example, age-restricted items such as alcohol and tobacco are flagged accordingly in the item data. Item data may also include information that is useful for predicting the availability of items at sources. For example, for each item-source combination (a particular item at a particular source), the item data may include a time that the item was last found, a time that the item was last not found (a picker looked for the item but could not find it), the rate at which the item is found, or the popularity of the item.

The item data also may include additional types of information associated with an item or an attribute (e.g., an item category, a brand, etc.) of an item. Examples of such types of information include: collections or pairings (e.g., of items, item categories, etc.), promotions (e.g., offers, rewards, discounts, coupons, etc.) that may be associated with an item, a brand, a source, etc., or any other suitable types of information. For example, if items associated with a peanut butter item category are often ordered or purchased with items associated with a jelly item category, the item categories may be included in a pairing. As an additional example, an item such as a particular brand of creamy peanut butter may be included in a collection of items associated with a campaign. In this example, additional items included in the collection of items may include a chunky peanut butter and a chocolate hazelnut spread of the same brand. In the above example, the items also may be associated with a promotion (e.g., $2.00 off any two items included in the collection). In embodiments in which the item data includes a promotion, the item data also may describe the promotion. In the above example, the item data also may include terms and conditions of the promotion (e.g., qualifying items, a maximum quantity of each item that may be ordered or purchased per user, a maximum number of users who may receive the promotion, a date through which the promotion is valid, etc.).

In some embodiments, the data collection module 200 maintains information describing collections, pairings, promotions, etc. in edges in an item graph. Edges in the item graph may be generated or removed by the data collection module 200 based on information it receives (e.g., from a retailer computing system 120, a user client device 100, or a picker client device 110) or information it derives (e.g., from conversion data). For example, an edge may include information describing a rate at which two items are ordered or purchased together, how recently the items were ordered or purchased together, or the quantities of the items that were ordered or purchased together. As an additional example, an edge may include information describing a collection to which two items or two item categories belong and a promotion associated with the collection. In the above example, the data collection module 200 may remove the edge or information describing the promotion from the edge when the promotion ends.

The data collection module 200 may maintain the item data in a database of items. Each database record in the database of items may be associated with an item available at a source, such that each database record includes a set of item data for a corresponding item. For example, a database record associated with an item may include a set of images of the item or a set of videos depicting the item. When the data collection module 200 receives item data for an item (e.g., from a retailer computing system 120), the data collection module 200 may update the database of items by storing the item data in a database record associated with the item. In the above example, when the data collection module 200 receives an image of the item, the data collection module 200 may update the database of items by storing the image in the database record associated with the item. In some embodiments, a set of item data for an item is associated with additional types of information, such as one or more collections or pairings of items, one or more promotions, etc. In such embodiments, the set of item data is stored in a database record associated with the item in association with information describing the additional types of information. In the above example, if the item is associated with a promotion, the database record may include information describing the promotion, such as terms and conditions of the promotion, a date through which the promotion is valid, etc. The data collection module 200 may collect item data from a retailer computing system 120, a picker client device 110, or a user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. Item categories also may be broader in that the same item category may include item types that are related to a common theme, found in the same department, etc. For example, items such as marinara, pesto, Alfredo, and Bolognese may be included in a "pasta sauce" item category. As an additional example, items such as bread, pasta, and cookies that are gluten-free may be included in a "gluten-free" item category, while items such as tortilla chips and tofu that are non-GMO may be included in a "non-GMO" item category. Furthermore, an item may be included in multiple categories. For example, croissants may be included in a "croissant" item category, a "pastry" item category, and a "bakery" item category. The item categories may be human-generated and human-populated with items. The item categories also may be generated automatically by the online system 140 (e.g., using a clustering algorithm).

The data collection module 200 also collects picker data, which is information or data describing characteristics of pickers. For example, the picker data for a picker may include the picker's name, the picker's location, how often the picker has serviced orders for the online system 140, a user rating for the picker, the retailers from which the picker has collected items, or the picker's previous shopping history. Additionally, the picker data may include preferences expressed by the picker, such as their preferred retailers for collecting items, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects conversion data, which is information or data describing characteristics of an order or a purchase. For example, conversion data may include item data for items that are included in an order, a delivery location for the order, a user associated with the order, a retailer location from which the user wants the ordered items collected, or a timeframe within which the user wants the order delivered. As an additional example, conversion data may include item data for items that are included in a purchase, user data for a user who made the purchase, and information describing the purchase (e.g., a source from which the user purchased the items and a date and time of the purchase). Conversion data may further include information describing how an order was serviced, such as which picker serviced the order, when the order was delivered, or a rating that the user gave the delivery of the order. In some embodiments, the conversion data includes user data for users associated with orders or purchases, such as user data for a user who placed an order or picker data for a picker who serviced the order. In some embodiments, the conversion data includes information or data describing characteristics of one or more additional types of conversions (e.g., adding an item to a shopping list, clicking on an item, etc.).

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. In this example, the content presentation module 210 then displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order an item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location or other source. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The content presentation module 210 also may generate an augmented reality element based on one or more supplemental items selected by the item identification/selection module 260, as described below. In some embodiments, the augmented reality element includes a listing of the supplemental item(s). The augmented reality element also may include information associated with one or more supplemental items. Examples of information associated with a supplemental item include: attributes of the supplemental item (e.g., a price, an item category, a brand, a size, etc. associated with the supplemental item), one or more promotions (e.g., offers, rewards, discounts, coupons, etc.) associated with the supplemental item (e.g., buy one get one free), a location of the supplemental item within a source, or any other suitable types of information. For example, the augmented reality element may include a list (e.g., a scrollable list) of supplemental items, in which each supplemental item is represented by an image of the supplemental item and a short description of the supplemental item (e.g., a brand, an item category, and a price associated with the supplemental item). In the above example, the augmented reality element also may include information describing a promotion associated with one or more of the supplemental items (e.g., terms and conditions of the promotion, a date through which the promotion is valid, etc.).

An augmented reality element generated by the content presentation module 210 also may include additional content. In some embodiments, the augmented reality element includes a selectable option associated with one or more supplemental items. Examples of selectable options associated with a supplemental item include: an option to display a set of directions to a location within a source associated with the supplemental item, an option to add the supplemental item to a shopping list associated with a user, an option to view additional information associated with the supplemental item (e.g., nutritional information, ingredients, etc.), or any other suitable options. For example, selectable options included in an augmented reality element associated with a supplemental item may be selected via interactive elements (e.g., buttons) included in the augmented reality element. The augmented reality element also may include a reason one or more supplemental items are included in the augmented reality element, a user's progress towards claiming an offer, or any other suitable types of content. For example, if supplemental items included in an augmented reality element are often paired with an item identified by the item identification/selection module 260 (described below), the augmented reality element may indicate this (e.g., "You also may be interested in the following items:"). As an additional example, suppose that supplemental items included in the augmented reality element and an item identified by the item identification/selection module 260 are associated with a collection and an offer that requires a user to purchase $20.00 worth of items included in the collection to receive $5.00 off their next purchase from a source. In this example, suppose also that the user previously placed an additional item (identified by the item identification/selection module 260) in a shopping cart (detected by the object detection module 250), in which the additional item is included in the collection and is $10.00. In this example, the augmented reality element may indicate that the user is already halfway towards claiming the offer and the identified item and the supplemental items included in the augmented reality element may help the user claim the offer.

Once the content presentation module 210 generates an augmented reality element, the augmented reality element may be displayed in a display area of a user client device 100. For example, the content presentation module 210 may send the augmented reality element to the user client device 100, causing the user client device 100 to display the augmented reality element. In this example, the augmented reality element may be displayed in a display screen of the user client device 100 if the user client device 100 is a smartphone or a tablet or in one or more lenses of the user client device 100 if the user client device 100 is a pair of augmented reality glasses. The augmented reality element may be overlaid onto a portion of the display area of the user client device 100 based on a location of an item identified by the item identification/selection module 260 within the field of view of the display area, as described below. For example, the augmented reality element may be overlaid onto a portion of the display area of the user client device 100 other than a location at which an item identified by the item identification/selection module 260 is detected (e.g., outside of a bounding box that identifies the location), as described below, such that it does not obstruct a view of a user of the user client device 100 of the identified item. In this example, the augmented reality element also may be overlaid such that a listing of one or more supplemental items included in the augmented reality element is displayed within a threshold distance of the identified item.

In embodiments in which an augmented reality element generated by the content presentation module 210 includes a selectable option associated with one or more supplemental items, the content presentation module 210 also may receive a request to select the selectable option. The content presentation module 210 may receive the request in various ways via a user client device 100 that displays the augmented reality element. For example, the content presentation module 210 may receive a request to select a selectable option included in an augmented reality element via one or more gestures made by a user associated with a user client device 100, one or more voice commands received from the user, by tracking the eyes of the user, via a physical controller associated with the user client device 100 or a touch screen of the user client device 100, etc.

In some embodiments, the content presentation module 210 receives a request to select a selectable option to add a supplemental item to a shopping list associated with a user. In such embodiments, the supplemental item is added to the shopping list via the ordering interface and the content presentation module 210 updates the ordering interface to reflect this. For example, the content presentation module 210 may update the ordering interface upon receiving a request to add a supplemental item to a shopping list, such that the shopping list includes information describing the supplemental item (e.g., a brand, an item category, a price, etc. associated with the supplemental item) and a quantity of the supplemental item added. In this example, the content presentation module 210 also may update a tentative subtotal associated with the shopping list. Furthermore, in some embodiments, the content presentation module 210 generates or updates an augmented reality element that includes the shopping list and the augmented reality element may then be displayed in the display area of a user client device 100. In the above example, the content presentation module 210 may generate an augmented reality element that includes information describing each item included in the shopping list. In this example, the content presentation module 210 may send the augmented reality element to a user client device 100, causing the user client device 100 to display the augmented reality element by overlaying it onto a portion of a display area of the user client device 100.

In various embodiments, the content presentation module 210 receives a request to view additional information associated with a supplemental item. In such embodiments, the content presentation module 210 generates or updates an augmented reality element that includes the additional information, which may then be displayed in a display area of a user client device 100. For example, suppose that an augmented reality element includes a supplemental item corresponding to a can of soup and a selectable option to view additional information associated with the supplemental item. In this example, if the content presentation module 210 receives a request from a user client device 100 to view the additional information, the content presentation module 210 may update the augmented reality element or generate an additional augmented reality element to include nutritional information, ingredients, etc. associated with the can of soup. In this example, the content presentation module 210 may send the augmented reality element to the user client device 100, causing the user client device 100 to display the augmented reality element by overlaying it onto a portion of a display area of the user client device 100.

In some embodiments, the content presentation module 210 receives a request to select a selectable option to display a set of directions to a location within a source associated with a supplemental item. In such embodiments, the content presentation module 210 generates or updates an augmented reality element that includes the set of directions, which may then be displayed in a display area of a user client device 100. The set of directions to the location within the source associated with the supplemental item may be determined by the wayfinding module 270, as described below. The augmented reality element may be overlaid onto a portion of the display area of the user client device 100. Furthermore, the set of directions included in the augmented reality element may correspond to a map, turn-by-turn instructions, or any other suitable types of directions, and may include audio, haptic feedback, etc. For example, if an augmented reality element includes a map, the map may be overlaid onto a portion of a display area of a user client device 100 so as to not obstruct a view of a user of the user client device 100 while using the user client device 100 (e.g., by overlaying the map in a corner of the display area). In the above example, if the augmented reality element also or alternatively includes turn-by-turn instructions corresponding to a set of arrows, the set of arrows may be overlaid onto a portion of the display area at which various building elements of the source (e.g., a floor of the source, aisles of the source, etc.) are detected (by the object detection module 250).

The order management module 220 manages orders for items from users. The order management module 220 receives orders from user client devices 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences for how far to travel to deliver an order, the picker's ratings by users, or how often the picker agrees to service an order.

In some embodiments, the order management module 220 determines when to assign an order to a picker based on a delivery timeframe requested by the user who placed the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location or other source associated with the order. If the order includes items to collect from multiple sources, the order management module 220 identifies the sources to the picker and may also specify a sequence in which the picker should visit the sources.

The order management module 220 may track the location of the picker through the picker client device 110 to determine when the picker arrives at the retailer location or other source. When the picker arrives at the source, the order management module 220 transmits the order to the picker client device 110 for display to the picker. As the picker uses the picker client device 110 to collect items at the source, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location or other source. The order management module 220 uses sensor data from the picker client device 110 or from sensors in the source to determine the location of the picker in the source. The order management module 220 may transmit, to the picker client device 110, instructions to display a map of the source indicating where in the source the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location or other source to the delivery location, or to a subsequent source for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online system 140.

The online system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model is used by the machine-learning model to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or conversion data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In situations in which the training example includes a label, the loss function is also based on the label for the training example. Some example loss functions include the mean square error function, the mean absolute error, the hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, conversion data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The object detection module 250 receives video data captured by a camera of a user client device 100, in which the video data depicts a field of view of a display area of the user client device 100. As described above, the user client device 100 may be an augmented reality device or a mixed reality device that integrates digital elements (e.g., visual, audio, haptic, etc.) with a user's environment in real time, or a personal or mobile computing device having the capabilities of an augmented or mixed reality device. For example, suppose that the user client device 100 is an augmented reality device, such as a pair of augmented reality glasses. In this example, the object detection module 250 receives video data captured by a camera of the augmented reality glasses. In some embodiments, the object detection module 250 receives image data captured by a camera of a user client device 100, in which the image data depicts a field of view of a display area of the user client device 100.

The object detection module 250 also detects an object within a field of view of a display area of a user client device 100 based on video data captured by a camera of the user client device 100. The object detection module 250 may detect the object based on three-dimensional information describing the object, such as the physical object itself depicted in the video data, or based on two-dimensional information describing the object, such as an image of the object or a text description of the object depicted in the video data. For example, three-dimensional information describing an object may be a physical 2-liter bottle of Brand A grape soda on a shelf, while two-dimensional information describing the object may include an image of the bottle of soda or a description of the bottle of soda (e.g., "2-liter bottles of Brand A grape soda") on a flyer, a poster, a banner, a screen, etc. The object detection module 250 may detect an object by applying one or more computer-vision techniques (e.g., single-shot detector (SSD), you only look once (YOLO), region-based convolutional neural network (R-CNN), etc.), one or more text extraction techniques (e.g., optical character recognition (OCR)), one or more natural language processing (NLP) techniques, or any other suitable technique or combination of techniques to the video data.

When detecting an object within a field of view of a display area of a user client device 100, the object detection module 250 may determine a class to which the object belongs, as well as a location of the object within video data depicting the field of view. In some embodiments, the class corresponds to an item category associated with an item available at a source. For example, the object detection module 250 may detect an object depicted in video data by applying, to the video data, one or more computer-vision techniques that detect objects based on shapes, colors, patterns, etc. depicted in the video data. In this example, the computer-vision techniques may be used to classify the object (e.g., using a multiclass classifier). In the above example, the computer-vision technique(s) also may determine coordinates of a bounding box that identifies the location of the object within the video data. Additionally, once the object detection module 250 detects an object within a field of view of a display area of a user client device 100, the object detection module 250 may track the movement of the object within the field of view of the display area (e.g., by tracking coordinates of a bounding box that identifies its location). In some embodiments, an object detected by the object detection module 250 corresponds to a building element (e.g., a floor, an aisle, a shelf, a wall, a stair, an elevator, a ceiling, a service counter, etc.) or other physical element (e.g., a shopping cart or a shopping basket) at a source.

In some embodiments, multiple objects are detected within a field of view of a display area of a user client device 100. In such embodiments, based on video data captured by a camera of the user client device 100, the object detection module 250 identifies a primary object within the field of view that is likely an object of interest to a user of the user client device 100. In some embodiments, the object detection module 250 identifies the primary object based on a distance between the objects and the user client device 100. In such embodiments, the object detection module 250 determines a distance between each object and the user client device 100 using depth-sensing technology, such as time-of-flight cameras, structured light sensors, or any other suitable technique or combination of techniques. The object detection module 250 may then identify the object closest to the user client device 100 as the primary object. For example, suppose that a user wearing a user client device 100 corresponding to a pair of augmented reality glasses is standing in front of a shelf full of objects detected by the object detection module 250. In this example, if the user picks up an object to view it more closely, since the object the user picked up is now closest to the user client device 100, the object detection module 250 may identify it as the primary object.

The object detection module 250 also may identify a primary object within a field of view of a display area of a user client device 100 that is likely an object of interest to a user of the user client device 100 based on additional types of information. The object detection module 250 also may identify the primary object based on a position of the object within an augmented reality element (e.g., a reticle) displayed in the display area of the user client device 100. For example, of multiple two-dimensional objects depicted in a flyer for a source, if a depiction of an object is within various markings of a reticle displayed in the display area of the user client device 100, the object detection module 250 may identify the object as the primary object. In some embodiments, the object detection module 250 identifies the primary object based on an interaction with the object by the user of the user client device 100. For example, if the user interacts with an object (e.g., by picking it up or looking at it, or via gestures, voice commands, a physical controller, a touch screen of the user client device 100, etc.), the object detection module 250 may identify the object as the primary object. The object detection module 250 also may identify the primary object based on a position of the object in the display area of the user client device 100. For example, the object detection module 250 may identify an object that is closest to the center of the display area of the user client device 100 as the primary object. In embodiments in which the object detection module 250 receives image data, the object detection module 250 detects the object or the primary object based on the image data in a manner analogous to that described above.

The item identification/selection module 260 may identify an object detected by the object detection module 250 as an item available at a source. The item identification/selection module 260 may do so by first accessing item data for items available at the source (e.g., the database of items), in which the item data includes one or more images of each item available at the source or a set of videos depicting the item. The item identification/selection module 260 may then apply one or more machine-learning algorithms to video data or image data depicting the object and an image of each item available at the source or a video depicting the item to identify the object as an item available at the source. The machine-learning algorithm(s) may include one or more computer vision algorithms, such as Harris corner detector, Scale-Invariant Feature Transform (SIFT), Speed Up Robust Features (SURF), or any other suitable algorithms. As described above, in some embodiments, the object detection module 250 detects an object based on textual data describing the object (e.g., on a flyer, a poster, a banner, a screen, etc.) depicted in video data or image data. In such embodiments, the item identification/selection module 260 may first access item data for items available at the source including textual information (e.g., a brand, an item category, a size, etc.) describing each item and apply the machine-learning algorithm(s) to the video data or the image data describing the object and to the textual information to identify the object as an item available at the source. Furthermore, in such embodiments, the machine-learning algorithm(s) may include one or more string similarity algorithms, such as edit-based algorithms, token-based algorithms, sequence-based algorithms, or any other suitable algorithms.

In some embodiments, the item identification/selection module 260 identifies an object detected by the object detection module 250 as an item available at a source using a large language model (LLM), such as a multi-modal LLM. In such embodiments, the item identification/selection module 260 generates a prompt that includes various components. The prompt may include information describing the object. For example, the prompt may include image or video data depicting the object, information describing a class to which the object belongs, a location of the object within the image/video data, etc. The prompt also may include item data for items available at the source. In the above example, the prompt may include one or more images of each item available at the source and information identifying or describing each item, such as an item identifier, a stock keeping unit (SKU), a serial number, a brand, an item category, a size/weight, a version/variety, etc. associated with the item, a location of the item at the source (e.g., an aisle number), etc. Additionally, the prompt may include a request to identify the object as an item available at the source. The item identification/selection module 260 may then provide the prompt to a multi-modal LLM to obtain an output and extract information identifying or describing the item from the output.

Once the item identification/selection module 260 identifies an object detected by the object detection module 250 as an item available at a source, the item identification/selection module 260 may store information describing the item in the data store 240. The information describing the item may be stored in association with various types of information. Examples of such types of information include: a location of the item within image/video data in which it was detected, a time at which it was detected, information describing a source at which the image/video data was captured, a location within a source associated with a user client device 100 that captured the image/video data, information describing a user associated with the user client device 100, etc.

Upon identifying an object detected by the object detection module 250 as an item available at a source, the item identification/selection module 260 may access item data for other items available at the source from the data store 240. For example, suppose that item data associated with an identified item indicates that the identified item is associated with a collection, a pairing, or a promotion. In this example, the item identification/selection module 260 may access item data for additional items available at the source, such as information indicating whether each additional item is also associated with the collection, pairing, or promotion. The item identification/selection module 260 may access item data for other items available at the source based on item data associated with the identified item. In the above example, the item identification/selection module 260 may first access the item graph and identify each additional item connected to the identified item by an edge. In this example, the item identification/selection module 260 may then access item data for each of these additional items.

The item identification/selection module 260 may select one or more supplemental items associated with an object it identifies as an item available at a source. The item identification/selection module 260 may do so based on a set of item data for the identified item and for each supplemental item it retrieves. For example, suppose that item data for the identified item indicates the identified item corresponding to a cleaning product is associated with a collection, such as a campaign for a new line of cleaning products or a brand of the cleaning product. In this example, based on item data for other items available at the source, the item identification/selection module 260 may select one or more supplemental items corresponding to one or more additional cleaning products associated with the campaign or of the same brand. As an additional example, suppose that based on the item graph, the identified item corresponding to hot dogs is paired with another item corresponding to hot dog buns. In this example, the item identification/selection module 260 may select a supplemental item corresponding to the hot dog buns.

The item identification/selection module 260 also may select one or more supplemental items associated with an object it identifies as an item available at a source based on other types of information. In some embodiments, the item identification/selection module 260 selects the supplemental item(s) associated with the identified item based on a set of user data for a user. In such embodiments, the item identification/selection module 260 retrieves the set of user data for the user from the data store 240 and predicts a likelihood the user will perform an action associated with each supplemental item it retrieves (e.g., adding the item to a shopping list associated with the user, ordering or purchasing the item, etc.). The item identification/selection module 260 may make the prediction based on the set of user data for the user and a set of item data for the supplemental item using the item selection model described above. The item identification/selection module 260 may then rank the supplemental items associated with the identified item and select one or more of the supplemental items based on the ranking (e.g., one or more supplemental items associated with at least a threshold ranking).

As described above, in some embodiments, the content presentation module 210 receives a request from a user client device 100 to select a selectable option to display a set of directions to a location within a source associated with a supplemental item. In such embodiments, the wayfinding module 270 retrieves information describing a current location, an orientation, or an elevation of the user client device 100 within the source, as well as information describing the location within the source associated with the supplemental item from the data store 240. For example, the wayfinding module 270 may retrieve GPS coordinates describing a current location of a user client device 100 within a source as well as an aisle and shelf within the source associated with a supplemental item. In some embodiments, the information describing the location within the source associated with the supplemental item includes information describing a layout of the source. In the above example, the aisle and shelf within the source associated with the supplemental item may be indicated on a layout of the source that also describes an arrangement of other aisles, departments, display tables or cases, etc. at the source.

In various embodiments, the wayfinding module 270 also determines a current location, an orientation, or an elevation of a user client device 100. The wayfinding module 270 may do so based on locations of various objects (e.g., building elements) detected by the object detection module 250. For example, the wayfinding module 270 may compare the locations of physical elements within a source (e.g., building elements depicted in video data) detected by the object detection module 250 to those at various locations within the source described in a layout of the source. In this example, the wayfinding module 270 may then determine a location, an elevation, or an orientation of a user client device 100 from which the video data was received based on the comparison.

The wayfinding module 270 also may determine a set of directions from a current location of a user client device 100 within a source to a location within the source associated with a supplemental item. The wayfinding module 270 may do so based on the current location of the user client device 100 within the source and the location within the source associated with the supplemental item. As described above, the set of instructions may correspond to a map, turn-by-turn instructions, or any other suitable types of directions, and may include audio, haptic feedback, etc. For example, a set of instructions may correspond to a path along a map of a source leading from a current location of a user client device 100 to a location associated with a supplemental item. Alternatively, in the above example, the set of instructions may include turn-by-turn instructions described by a set of arrows of varying lengths that, when overlaid onto a floor of the source, correspond to the path along the map. In the above example, the set of instructions also may include audio instructions telling the user when to turn, when to continue down an aisle, where to look on a shelf or in a display case, etc. Continuing with the above example, the set of instructions also may include haptic feedback (e.g., vibrations) that tell the user when they have veered off the path.

Figure 2B:
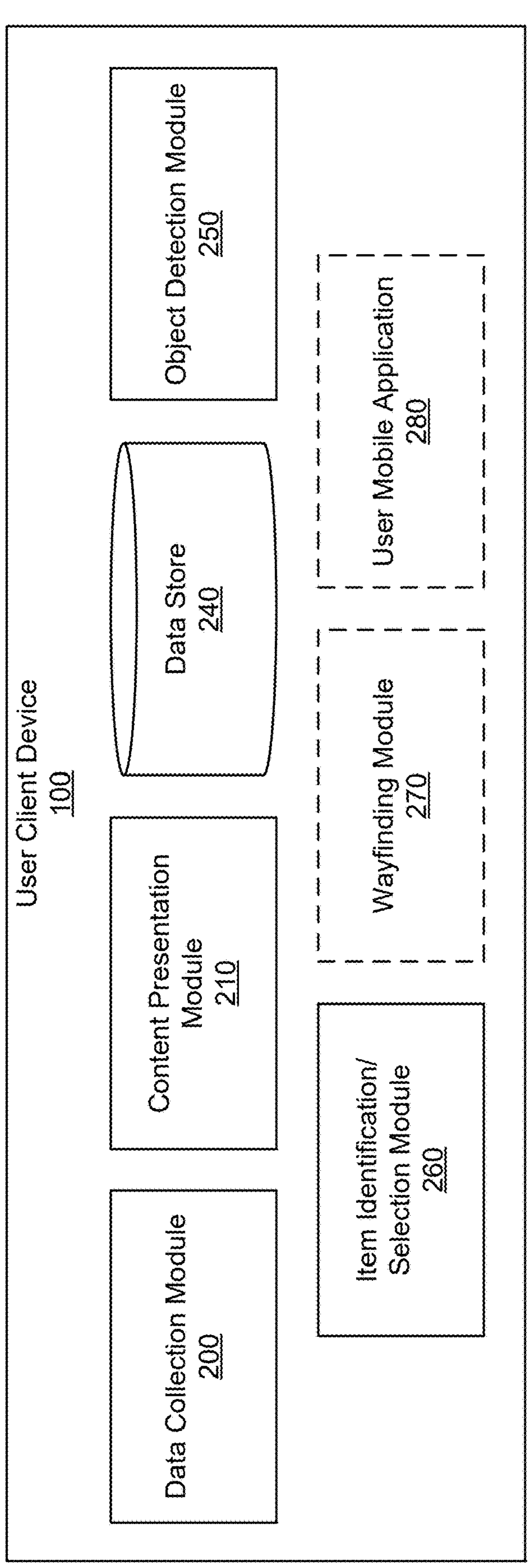
FIG. 2B illustrates an example system architecture for a user client device, in accordance with one or more embodiments.

FIG. 2B illustrates an example system architecture for a user client device 100, in accordance with some embodiments. The system architecture illustrated in FIG. 2B includes the data collection module 200, the content presentation module 210, the data store 240, the object detection module 250, and the item identification/selection module 260. In some embodiments, the system architecture also includes the wayfinding module 270 and a user mobile application 280. Alternative embodiments may include more, fewer, or different components from those illustrated in FIG. 2B, and the functionality of each component may be divided between the components differently from the description below. Additionally, each component may perform their respective functionalities in response to a request from a human, or automatically without human intervention. Via the user mobile application 280, the user may access the communication interface that allows the user to communicate with a picker that is servicing the user's order and the ordering interface that allows the user to search for items that are available through the online system 140 to select which items to add to a shopping list, as described above. The functionality of the remaining components of the user client device 100 perform some or all of the functions in a manner analogous to that described above with respect to FIG. 2A. For example, in embodiments in which the content presentation module 210 is a component of the user client device 100, once the content presentation module 210 generates an augmented reality element, the content presentation module 210 displays the augmented reality element in a display area of the user client device 100 (e.g., a screen of a smartphone or lenses of a pair of augmented reality glasses).

Figure 3:
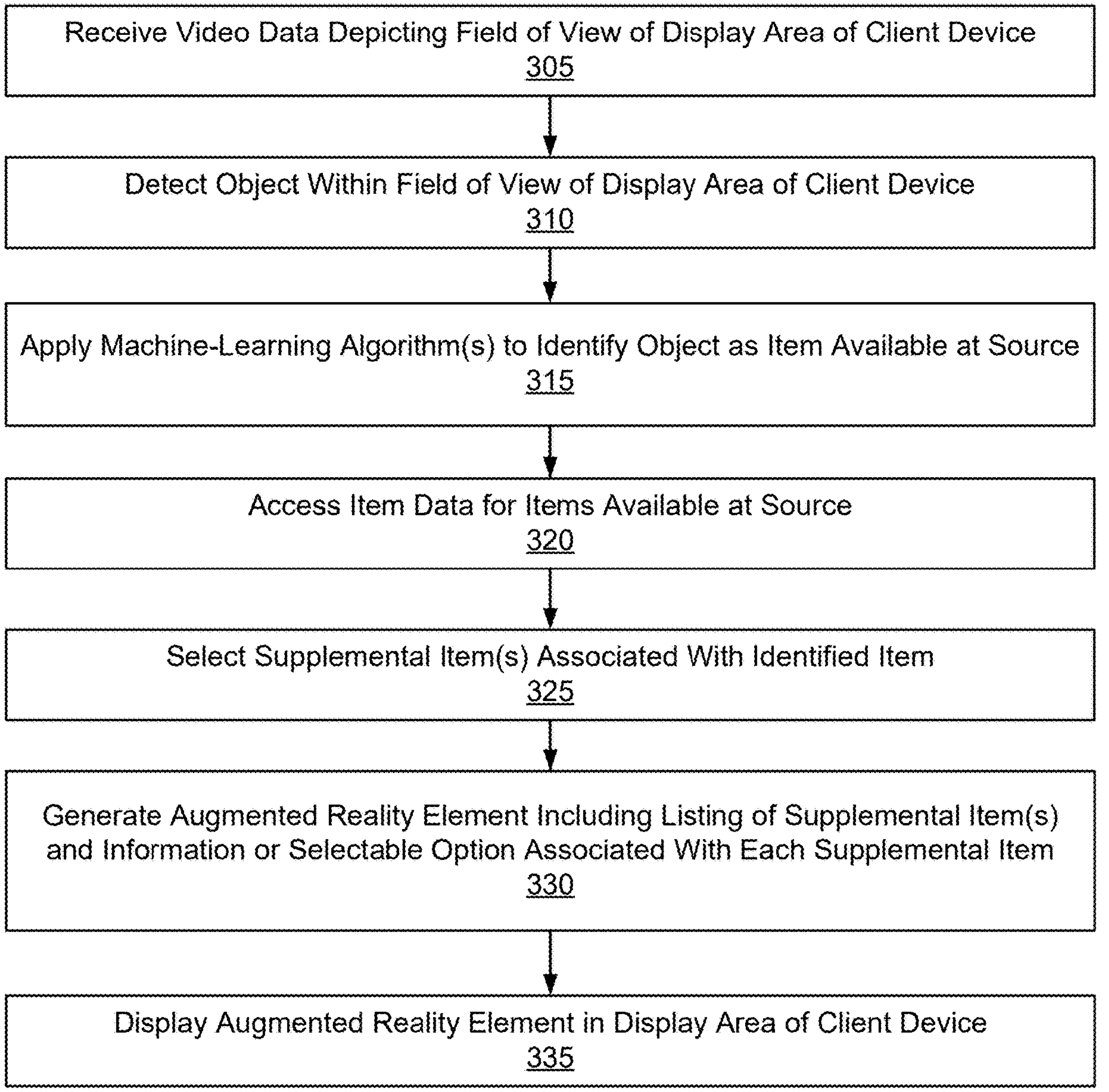
FIG. 3 is a flowchart of a method for displaying an augmented reality element listing supplemental items associated with a detected item, in accordance with one or more embodiments.

FIG. 3 is a flowchart for a method of displaying an augmented reality element listing supplemental items associated with a detected item, in accordance with some embodiments. Alternative embodiments may include more, fewer, or different steps from those illustrated in FIG. 3, and the steps may be performed in a different order from that illustrated in FIG. 3. These steps may be performed by a user client device (e.g., user client device 100), such as an augmented reality device, or an online system (e.g., online system 140) communicating with the user client device, such as an online concierge system. Additionally, each of these steps may be performed automatically by the user client device 100 or the online system 140 without human intervention.

The user client device 100/online system 140 receives (step 305, e.g., via the object detection module 250) video data captured by a camera of a user client device 100, in which the video data depicts a field of view of a display area of the user client device 100. As described above, the user client device 100 may be an augmented reality device or a mixed reality device that integrates digital elements (e.g., visual, audio, haptic, etc.) with a user's environment in real time, or a personal or mobile computing device having the capabilities of an augmented or mixed reality device. In some embodiments, the user client device 100/online system 140 receives (step 305) image data captured by the camera of the user client device 100, in which the image data depicts the field of view of the display area of the user client device 100.

The user client device 100/online system 140 then detects 310 (e.g., using the object detection module 250) an object within the field of view of the display area of the user client device 100 based on the video data. The user client device 100/online system 140 may detect 310 the object based on three-dimensional information describing the object, such as the physical object itself depicted in the video data, or based on two-dimensional information describing the object, such as an image or a text description of the object depicted in the video data. The user client device 100/online system 140 may detect 310 the object by applying one or more computer-vision techniques (e.g., single-shot detector (SSD), you only look once (YOLO), region-based convolutional neural network (R-CNN), etc.), one or more text extraction techniques (e.g., optical character recognition (OCR)), one or more natural language processing (NLP) techniques, or any other suitable technique or combination of techniques to the video data.

When detecting 310 the object, the user client device 100/online system 140 may determine (e.g., using the object detection module 250) a class to which the object belongs, as well as a location (e.g., a bounding box) of the object within the video data. In some embodiments, the class corresponds to an item category associated with an item available at a source. Additionally, once the user client device 100/online system 140 detects 310 the object, the user client device 100/online system 140 may track (e.g., using the object detection module 250) the movement of the object within the field of view of the display area (e.g., by tracking coordinates of a bounding box that identifies its location). In some embodiments, the object detected 310 by the user client device 100/online system 140 corresponds to a building element (e.g., a floor, an aisle, a shelf, a wall, a stair, an elevator, a ceiling, a service counter, etc.) or other physical element (e.g., a shopping cart or a shopping basket) at a source.

In some embodiments, multiple objects are detected 310 within the field of view of the display area of the user client device 100. In such embodiments, based on the video data, the user client device 100/online system 140 identifies (e.g., using the object detection module 250) a primary object within the field of view that is likely an object of interest to a user of the user client device 100. In some embodiments, the user client device 100/online system 140 identifies the primary object based on a distance between the objects and the user client device 100. In such embodiments, the user client device 100/online system 140 determines (e.g., using the object detection module 250) a distance between each object and the user client device 100 using depth-sensing technology, such as time-of-flight cameras, structured light sensors, or any other suitable technique or combination of techniques. The user client device 100/online system 140 may then identify the object closest to the user client device 100 as the primary object.

Figure 4:
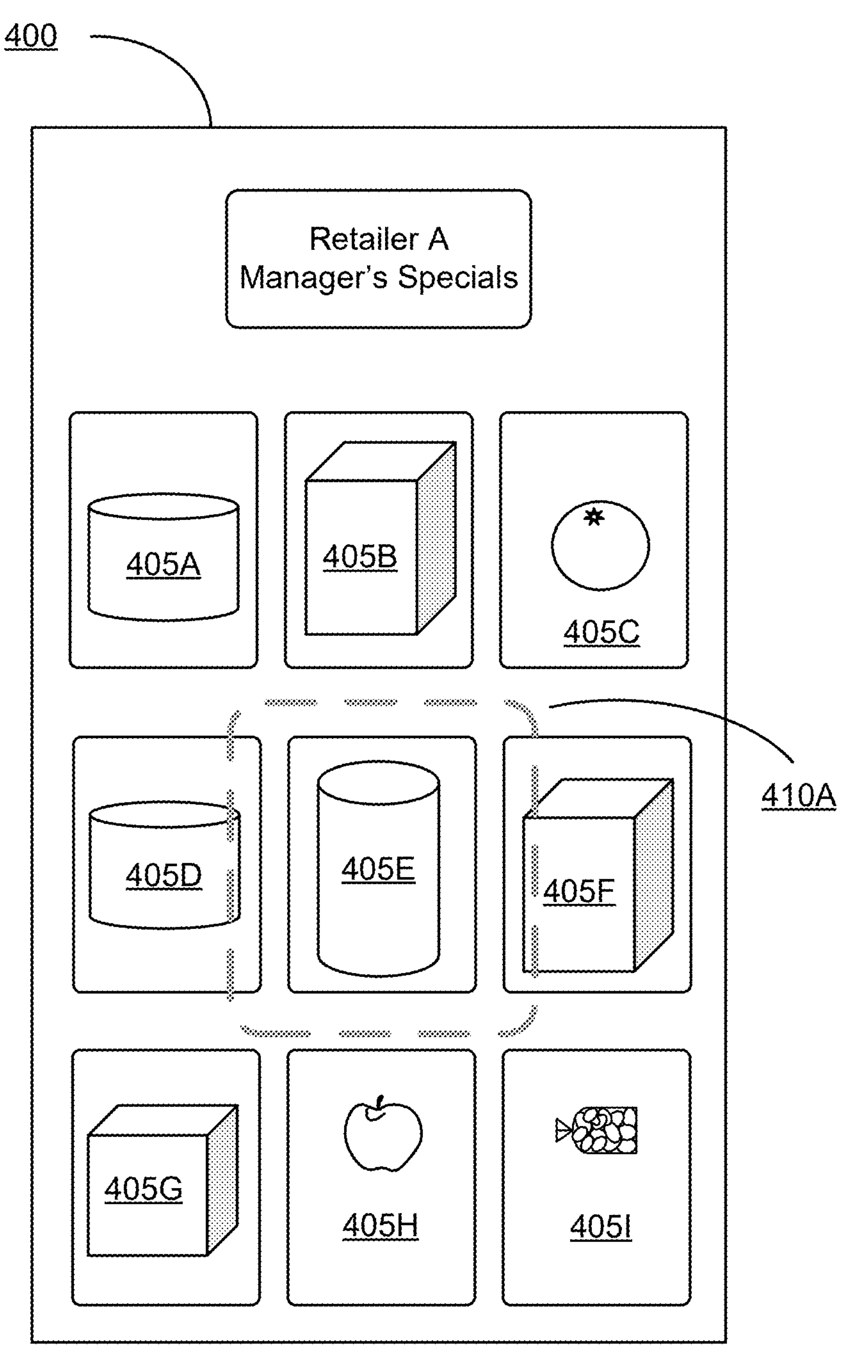
FIG. 4 illustrates an example of identifying a primary object included among multiple objects, in accordance with one or more embodiments.

The user client device 100/online system 140 also may identify the primary object based on additional types of information. The user client device 100/online system 140 also may identify the primary object based on a position of the object within an augmented reality element (e.g., a reticle) displayed in the display area of the user client device 100. FIG. 4 illustrates an example of identifying a primary object included among multiple objects, in accordance with one or more embodiments. As shown in FIG. 4, of multiple two-dimensional objects 405A-I depicted in a flyer 400 for a source, if a depiction of an object 405E is within various markings of an augmented reality element 410 corresponding to a reticle displayed in the display area of the user client device 100, the user client device 100/online system 140 may identify the object 405E as the primary object 405. In some embodiments, the user client device 100/online system 140 identifies the primary object 405 based on an interaction with the object 405 by the user of the user client device 100 (e.g., by picking it up or looking at it, or via gestures, voice commands, a physical controller, a touch screen of the user client device 100, etc.). The user client device 100/online system 140 also may identify the primary object 405 based on a position of the object 405 in the display area of the user client device 100 (e.g., if it is closest to the center of the display area). In embodiments in which the user client device 100/online system 140 receives (step 305) image data, the user client device 100/online system 140 detects 310 the object 405 or the primary object 405 based on the image data in a manner analogous to that described above.

Referring again to FIG. 3, the user client device 100/online system 140 identifies (e.g., using the item identification/selection module 260) the detected object 405 (or the primary object 405 if multiple objects 405 are detected 310) as an item available at a source. The user client device 100/online system 140 may do so by first accessing (e.g., using the item identification/selection module 260) item data for items available at the source (e.g., the database of items), in which the item data includes one or more images of each item available at the source or a set of videos depicting the item. The user client device 100/online system 140 may then apply 315 (e.g., using the item identification/selection module 260) one or more machine-learning algorithms to the image/video data depicting the object 405 and an image of each item available at the source or a video depicting the item to identify the object 405 as an item available at the source. The machine-learning algorithm(s) may include one or more computer vision algorithms, such as Harris corner detector, Scale-Invariant Feature Transform (SIFT), Speed Up Robust Features (SURF), or any other suitable algorithms. As described above, in some embodiments, the user client device 100/online system 140 detects 310 the object 405 based on textual data describing the object 405 (e.g., on a flyer, a poster, a banner, a screen, etc.) depicted in the image/video data. In such embodiments, the user client device 100/online system 140 may first access item data for items available at the source including textual information (e.g., a brand, an item category, a size, etc.) describing each item and apply 315 the machine-learning algorithm(s) to the video data or the image data describing the object 405 and to the textual information to identify the object 405 as an item available at the source. Furthermore, in such embodiments, the machine-learning algorithm(s) may include one or more string similarity algorithms, such as edit-based algorithms, token-based algorithms, sequence-based algorithms, or any other suitable algorithms.

In some embodiments, the user client device 100/online system 140 identifies the detected/primary object 405 as an item available at the source using a large language model (LLM), such as a multi-modal LLM. In such embodiments, the user client device 100/online system 140 generates (e.g., using the item identification/selection module 260) a prompt that includes various components. The prompt may include information describing the detected/primary object 405, item data for items available at the source, and a request to identify the detected/primary object 405 as an item available at the source. The user client device 100/online system 140 may then provide (e.g., using the item identification/selection module 260) the prompt to the multi-modal LLM to obtain an output and extract (e.g., using the item identification/selection module 260) information identifying or describing the item from the output.

Once the user client device 100/online system 140 identifies the detected/primary object 405 as an item available at the source, the user client device 100/online system 140 may store (e.g., using the item identification/selection module 260) information describing the item (e.g., in the data store 240). The information describing the item may be stored in association with various types of information. Examples of such types of information include: a location within the image/video data in which it was detected 310, a time at which it was detected 310, information describing the source at which the image/video data was captured, a location within the source associated with the user client device 100 that captured the image/video data, information describing the user associated with the user client device 100, etc.

Figure 5A:
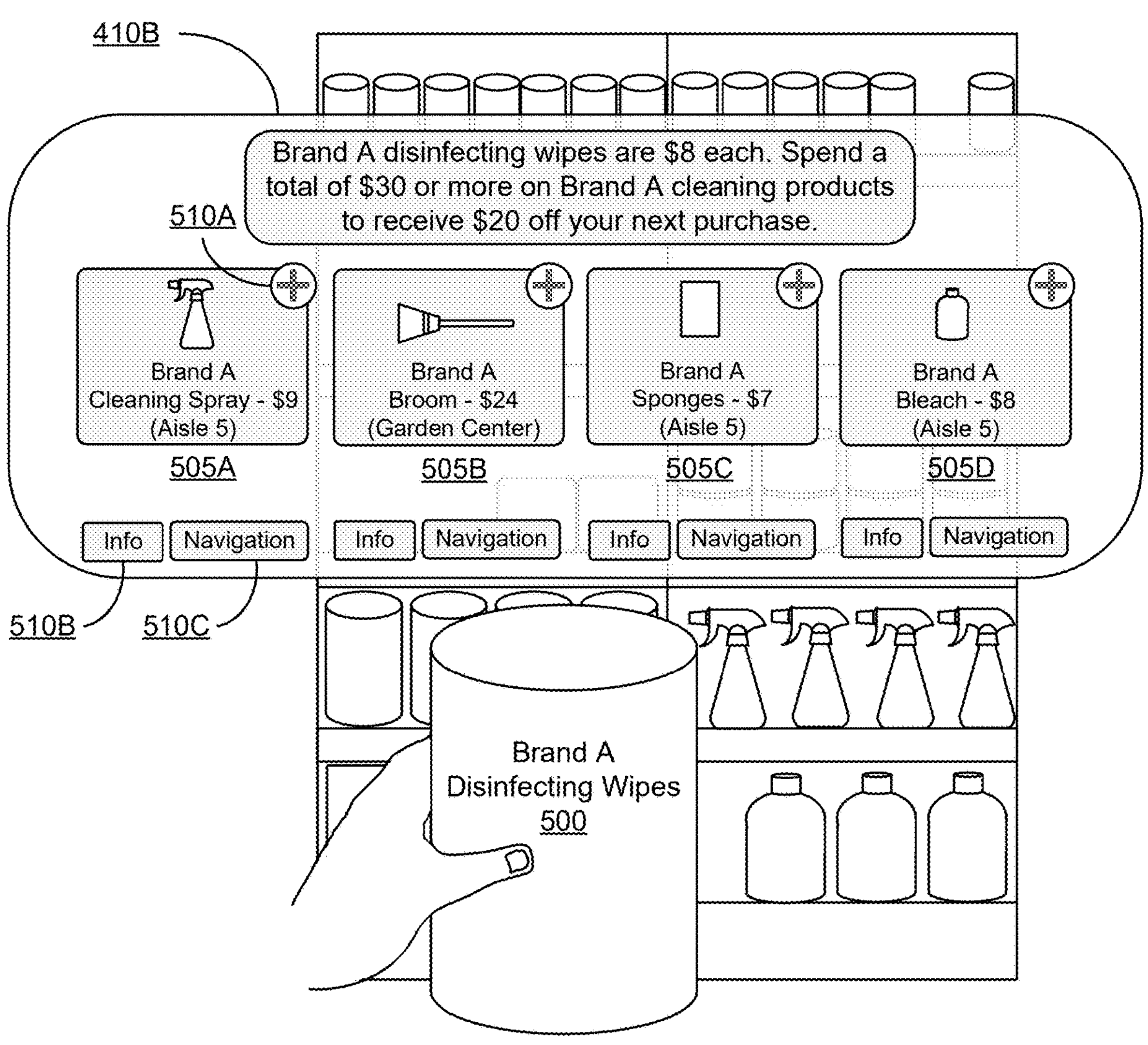
FIG. 5A illustrates an example of an augmented reality element listing supplemental items associated with an item, in accordance with one or more embodiments.

Upon identifying the detected/primary object 405 as an item available at the source, the user client device 100/online system 140 may access (step 320, e.g., using the item identification/selection module 260) item data for other items available at the source (e.g., from the data store 240). For example, as shown in FIG. 5A, which illustrates an example of an augmented reality element listing supplemental items associated with an item, in accordance with one or more embodiments, suppose that item data associated with the identified item 500 indicates that the identified item 500 is associated with a collection, a pairing, or a promotion. In this example, the user client device 100/online system 140 may access (step 320) item data for additional items available at the source, such as information indicating whether each additional item is also associated with the collection, pairing, or promotion. The user client device 100/online system 140 may access (step 320) item data for other items available at the source based on item data associated with the identified item 500. In the above example, the user client device 100/online system 140 may first access (e.g., using the item identification/selection module 260) the item graph and identify (e.g., using the item identification/selection module 260) each additional item connected to the identified item 500 by an edge. In this example, the user client device 100/online system 140 may then access (step 320) item data for each of these additional items.

Referring back to FIG. 3, the user client device 100/online system 140 may select 325 (e.g., using the item identification/selection module 260) one or more supplemental items associated with the identified item 500. The user client device 100/online system 140 may do so based on a set of item data for the identified item 500 and for each supplemental item it retrieves. For example, as shown in FIG. 5A, suppose that item data for the identified item 500 indicates the identified item 500 corresponding to Brand A disinfecting wipes is associated with a collection, such as a campaign for Brand A cleaning products. In this example, based on item data for other items available at the source, the user client device 100/online system 140 may select 325 four supplemental items 505A-D corresponding to four additional Brand A cleaning products.

The user client device 100/online system 140 also may select 325 the supplemental item(s) 505 associated with the identified item 500 based on other types of information. In some embodiments, the user client device 100/online system 140 selects 325 the supplemental item(s) 505 associated with the identified item 500 based on a set of user data for the user associated with the user client device 100. In such embodiments, the user client device 100/online system 140 retrieves (e.g., using the item identification/selection module 260) the set of user data for the user (e.g., from the data store 240) and predicts (e.g., using the item identification/selection module 260) a likelihood the user will perform an action associated with each supplemental item 505 it retrieves (e.g., adding the item to a shopping list associated with the user, ordering or purchasing the item, etc.). The user client device 100/online system 140 may make the prediction based on the set of user data for the user and a set of item data for the supplemental item 505 using the item selection model described above. The user client device 100/online system 140 may then rank (e.g., using the item identification/selection module 260) the supplemental items 505 associated with the identified item 500 and select 325 the supplemental item(s) 505 based on the ranking (e.g., one or more supplemental items 505 associated with at least a threshold ranking).

Referring again to FIG. 3, the user client device 100/online system 140 then generates 330 (e.g., using the content presentation module 210) an augmented reality element 410 based on the supplemental item(s) 505. In some embodiments, the augmented reality element 410 includes a listing of the supplemental item(s) 505. The augmented reality element 410 also may include information associated with one or more supplemental items 505. Examples of information associated with a supplemental item 505 include: attributes of the supplemental item 505 (e.g., a price, an item category, a brand, a size, etc. associated with the supplemental item 505), one or more promotions (e.g., offers, rewards, discounts, coupons, etc.) associated with the supplemental item 505 (e.g., buy one get one free), a location of the supplemental item 505 within the source, or any other suitable types of information. For example, as shown in FIG. 5A, the augmented reality element 410B may include a list (e.g., a scrollable list) of the supplemental items 505A-D, in which each supplemental item 505A-D is represented by an image of the supplemental item 505A-D and a short description of the supplemental item 505A-D (e.g., the brand, the item category, and the price associated with the supplemental item 505A-D). In the above example, the augmented reality element 410B also may include information describing a promotion associated with the supplemental items 505A-D (e.g., "Brand A disinfecting wipes are $8 each. Spend a total of $30 or more on Brand A cleaning products to receive $20 off your next purchase.").

The augmented reality element 410 also may include additional content. In some embodiments, the augmented reality element 410 includes a selectable option associated with one or more of the supplemental items 505. Examples of selectable options associated with a supplemental item 505 include: an option to display a set of directions to a location within a source associated with the supplemental item 505, an option to add the supplemental item 505 to a shopping list associated with the user, an option to view additional information associated with the supplemental item 505 (e.g., nutritional information, ingredients, etc.), or any other suitable options. For example, as shown in FIG. 5A, selectable options included in the augmented reality element 410B associated with each supplemental item 505A-D may be selected via interactive elements. In this example, the interactive elements may correspond to a button 510A to add each supplemental item 505A-D, a button 510B to view additional information associated with each supplemental item 505A-D, and a button 510C to display a set of directions to a location within the source associated with each supplemental item 505A-D. The augmented reality element 410 also may include a reason the supplemental item(s) 505 is/are included in the augmented reality element 410, the user's progress towards claiming an offer, or any other suitable types of content.

Referring once more to FIG. 3, once the user client device 100/online system 140 generates 330 the augmented reality element 410, the augmented reality element 410 may be displayed 335 in the display area of the user client device 100. The augmented reality element 410 may be overlaid onto a portion of the display area of the user client device 100 based on a location of the identified item 500 within the field of view of the display area. For example, as shown in FIG. 5A, the augmented reality element 410B may be overlaid onto a portion of the display area of the user client device 100 other than the location at which the identified item 500 is detected 310 (e.g., outside of a bounding box that identifies the location), such that it does not obstruct a view of the user of the identified item 500. In this example, the augmented reality element 410B also may be overlaid such that the listing of the supplemental items 505A-D included in the augmented reality element 410B is displayed 335 within a threshold distance of the identified item 500.

In embodiments in which the augmented reality element 410 includes a selectable option associated with one or more supplemental items 505, the user client device 100/online system 140 also may receive (e.g., via the content presentation module 210) a request to select the selectable option. The user client device 100/online system 140 may receive the request in various ways via the user client device 100 (e.g., via one or more gestures made by the user, one or more voice commands received from the user, by tracking the eyes of the user, via a physical controller associated with the user client device 100 or a touch screen of the user client device 100, etc.).

Figure 5B:
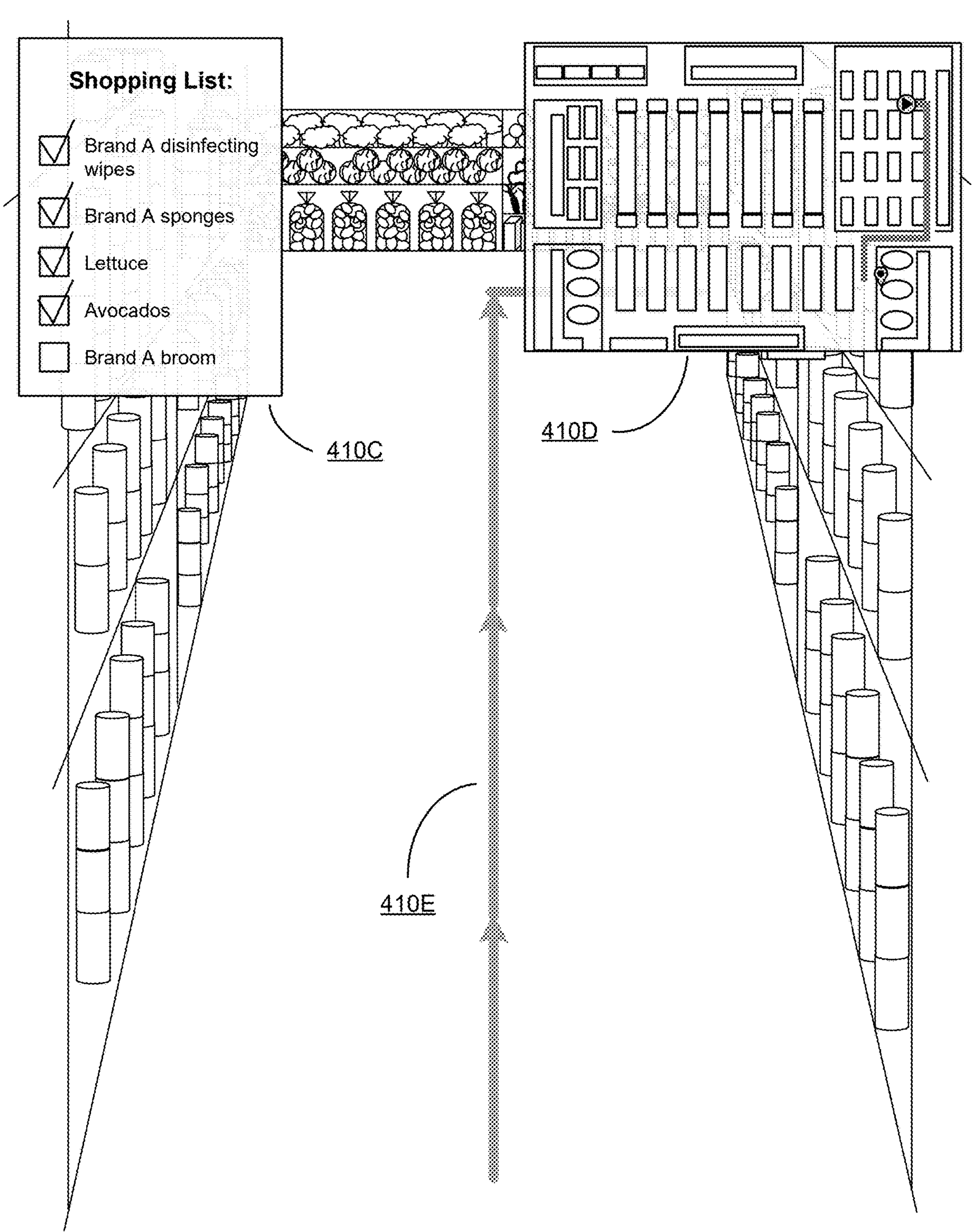
FIG. 5B illustrates an example of augmented reality elements including a set of directions to a location within a source associated with a supplemental item, in accordance with one or more embodiments.

In some embodiments, the user client device 100/online system 140 receives a request to select a selectable option to add a supplemental item 505 to the shopping list associated with the user. In such embodiments, the supplemental item 505 is added (e.g., using the user mobile application 280) to the shopping list via the ordering interface and the user client device 100/online system 140 updates (e.g., using the content presentation module 210) the ordering interface to reflect this. For example, as shown in FIG. 5A, the user client device 100/online system 140 may receive a request to select a selectable option to add a supplemental item 505B corresponding to Brand A broom to the shopping list associated with the user. Furthermore, in some embodiments, the user client device 100/online system 140 generates 330 (e.g., using the content presentation module 210) an additional augmented reality element 410 that includes the shopping list or updates the augmented reality element 410 to include the shopping list and the additional/updated augmented reality element 410 may then be displayed 335 in the display area of the user client device 100. FIG. 5B illustrates an example of augmented reality elements including a set of directions to a location within a source associated with a supplemental item, in accordance with one or more embodiments, and continues the example described above in conjunction with FIG. 5A. As shown in FIG. 5B, the user client device 100/online system 140 may generate 330 an additional augmented reality element 410C that includes information describing each item included in the shopping list. In this example, the augmented reality element 410C may be displayed 335 in the display area of the user client device 100.

In various embodiments, the user client device 100/online system 140 receives a request to view additional information associated with a supplemental item 505. In such embodiments, the user client device 100/online system 140 generates 330 (e.g., using the content presentation module 210) an additional augmented reality element 410 that includes the additional information or updates (e.g., using the content presentation module 210) the augmented reality element 410 to include the additional information. The additional/updated augmented reality element 410 may then be displayed 335 in the display area of the user client device 100.

In some embodiments, the user client device 100/online system 140 receives a request to select a selectable option to display a set of directions to a location within the source associated with a supplemental item 505. In such embodiments, the user client device 100/online system 140 generates 330 (e.g., using the content presentation module 210) an additional augmented reality element 410 that includes the set of directions or updates the augmented reality element 410 to include the set of directions. The additional/updated augmented reality element 410 may then be displayed 335 in the display area of the user client device 100. The set of directions to the location within the source associated with the supplemental item 505 may be determined by the user client device 100/online system 140 (e.g., using the wayfinding module 270), as described below. The augmented reality element 410 may be overlaid onto a portion of the display area of the user client device 100. Furthermore, the set of directions included in the augmented reality element 410 may correspond to a map, turn-by-turn instructions, or any other suitable types of directions, and may include audio, haptic feedback, etc. For example, as shown in FIG. 5B, if the augmented reality element 410D includes a map, the map may be overlaid onto a portion of the display area of the user client device 100 so as to not obstruct a view of the user while using the user client device 100 (e.g., by overlaying the map in a corner of the display area). In the above example, if the augmented reality element 410E also or alternatively includes turn-by-turn instructions corresponding to a set of arrows, the set of arrows may be overlaid onto a portion of the display area at which various building elements of the source (e.g., a floor of the source, aisles of the source, etc.) are detected 310.

As described above, in some embodiments, the user client device 100/online system 140 receives a request from the user client device 100 to select a selectable option to display a set of directions to a location within the source associated with a supplemental item 505. In such embodiments, the user client device 100/online system 140 retrieves (e.g., using the wayfinding module 270) information describing a current location, an orientation, or an elevation of the user client device 100 within the source, as well as information describing the location within the source associated with the supplemental item 505 (e.g., from the data store 240). In some embodiments, the information describing the location within the source associated with the supplemental item 505 includes information describing a layout of the source. In various embodiments, the user client device 100/online system 140 also determines (e.g., using the wayfinding module 270) the current location, the orientation, or the elevation of the user client device 100. The user client device 100/online system 140 may do so based on locations of various objects 405 (e.g., building elements) detected 310 by the user client device 100/online system 140. The user client device 100/online system 140 also may determine (e.g., using the wayfinding module 270) the set of directions from the current location of the user client device 100 within the source to the location within the source associated with the supplemental item 505. The user client device 100/online system 140 may do so based on the current location of the user client device 100 within the source and the location within the source associated with the supplemental item 505.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

receiving video data captured by a camera of a client device, wherein the video data depicts a field of view of a display area of the client device;

detecting a plurality of objects within the field of view of the display area of the client device based at least in part on the video data;

receiving depth data captured by a depth sensor of the client device, wherein the depth data describes a distance between each of the plurality of objects and the client device;

identifying a primary object from the plurality of objects based on the distances of the plurality of objects and the client device;

accessing item data for a plurality of items available at a source;

identifying the primary object as an item available at the source by:

generating a prompt for a multi-modal large language model, wherein the prompt comprises the video data, the depth data, information describing the primary object, the item data for the plurality of items, and instructions for the multi-modal large language model to identify the item based on the video data, the item data, the depth data, and the information describing the primary object;

transmitting the prompt to the multi-modal large language model; and receiving a response to the prompt from the multi-modal large language model, wherein the response identifies the primary object as the item available at the source;

selecting one or more supplemental items associated with the identified item based at least in part on a set of item data for the identified item and each supplemental item of the one or more supplemental items;

generating an augmented reality element comprising a listing of the one or more supplemental items and, for each supplemental item of the one or more supplemental items, one or more of: information associated with a corresponding supplemental item or a selectable option associated with the corresponding supplemental item; and displaying the augmented reality element in the display area of the client device, wherein the augmented reality element is overlaid onto a portion of the display area based at least in part on a location within the field of view of the display area at which the item is detected.

2. The method of claim 1, wherein detecting the plurality of objects within the field of view of the display area of the client device based at least in part on the video data comprises detecting the item within the field of view of the display area of the client device based on one or more of: a position of the item within an additional augmented reality element displayed in the display area of the client device, or an interaction with the object by a user of the client device.

3. The method of claim 1, wherein selecting the one or more supplemental items associated with the identified item based at least in part on the set of item data for the identified item and each supplemental item of the one or more supplemental items comprises identifying the one or more supplemental items associated with the identified item based on one or more of: information describing a collection of items comprising the identified item and the one or more supplemental items, a pairing of the identified item with each supplemental item of the one or more supplemental items, or a promotion associated with the identified item and the one or more supplemental items.

4. The method of claim 1, wherein generating the augmented reality element comprising the listing of the one or more supplemental items and, for each supplemental item of the one or more supplemental items, information associated with the corresponding supplemental item comprises generating the augmented reality element comprising information describing a set of promotions associated with the corresponding supplemental item.

5. The method of claim 1, wherein generating the augmented reality element comprising the listing of the one or more supplemental items and, for each supplemental item of the one or more supplemental items, the selectable option associated with the corresponding supplemental item comprises generating the augmented reality element comprising the selectable option to display a set of directions to a location within the source associated with the corresponding supplemental item.

6. The method of claim 5, further comprising:

receiving a request to select the selectable option to display the set of directions to the location within the source associated with the corresponding supplemental item;

retrieving information describing a current location of the client device within the source;

retrieving information describing the location within the source associated with the corresponding supplemental item;

determining the set of directions from the current location of the client device within the source to the location within the source associated with the corresponding supplemental item;

generating an additional augmented reality element comprising the set of directions from the current location of the client device within the source to the location within the source associated with the corresponding supplemental item; and displaying the additional augmented reality element in the display area of the client device, wherein the augmented reality element is overlaid onto a portion of the display area.

7. The method of claim 1, wherein generating the augmented reality element comprising the listing of the one or more supplemental items and, for each supplemental item of the one or more supplemental items, the selectable option associated with the corresponding supplemental item comprises generating the augmented reality element comprising the selectable option to add the corresponding supplemental item to a shopping list.

8. The method of claim 7, further comprising:

receiving a request to select the selectable option to add the corresponding supplemental item to the shopping list; and adding the corresponding supplemental item to the shopping list.

9. The method of claim 1, wherein selecting the one or more supplemental items associated with the identified item based at least in part on the set of item data for the identified item and each supplemental item of the one or more supplemental items comprises:

retrieving a set of user data associated with a user of the client device;

predicting a likelihood the user will perform an action associated with each supplemental item of a plurality of supplemental items associated with the identified item based at least in part on the set of user data associated with the user and the set of item data for a corresponding supplemental item;

ranking the plurality of supplemental items based at least in part on the likelihood predicted for each supplemental item of the plurality of supplemental items; and selecting the one or more supplemental items associated with the identified item based at least in part on the ranking.

10. A computer program product comprising a non-transitory computer-readable storage medium having instructions encoded thereon that, when executed by a processor, cause the processor to perform steps comprising:

receiving video data captured by a camera of a client device, wherein the video data depicts a field of view of a display area of the client device;

detecting a plurality of objects within the field of view of the display area of the client device based at least in part on the video data;

receiving depth data captured by a depth sensor of the client device, wherein the depth data describes a distance between each of the plurality of objects and the client device;

identifying a primary object from the plurality of objects based on the distances of the plurality of objects and the client device;

accessing item data for a plurality of items available at a source;

identifying the primary object as an item available at the source by:

generating a prompt for a multi-modal large language model, wherein the prompt comprises the video data, the depth data, information describing the primary object, the item data for the plurality of items, and instructions for the multi-modal large language model to identify the item based on the video data, the item data, the depth data, and the information describing the primary object;

transmitting the prompt to the multi-modal large language model; and receiving a response to the prompt from the multi-modal large language model, wherein the response identifies the primary object as the item available at the source;

selecting one or more supplemental items associated with the identified item based at least in part on a set of item data for the identified item and each supplemental item of the one or more supplemental items;

generating an augmented reality element comprising a listing of the one or more supplemental items and, for each supplemental item of the one or more supplemental items, one or more of: information associated with a corresponding supplemental item or a selectable option associated with the corresponding supplemental item; and displaying the augmented reality element in the display area of the client device, wherein the augmented reality element is overlaid onto a portion of the display area based at least in part on a location within the field of view of the display area at which the item is detected.

11. The computer program product of claim 10, wherein detecting the object within the field of view of the display area of the client device based at least in part on the video data comprises detecting the item within the field of view of the display area of the client device based on one or more of: a distance between the object and the client device, a position of the item within an additional augmented reality element displayed in the display area of the client device, or an interaction with the object by a user of the client device.

12. The computer program product of claim 10, wherein selecting the one or more supplemental items associated with the identified item based at least in part on the set of item data for the identified item and each supplemental item of the one or more supplemental items comprises identifying the one or more supplemental items associated with the identified item based on one or more of: information describing a collection of items comprising the identified item and the one or more supplemental items, a pairing of the identified item with each supplemental item of the one or more supplemental items, or a promotion associated with the identified item and the one or more supplemental items.

13. The computer program product of claim 10, wherein generating the augmented reality element comprising the listing of the one or more supplemental items and, for each supplemental item of the one or more supplemental items, information associated with the corresponding supplemental item comprises generating the augmented reality element comprising information describing a set of promotions associated with the corresponding supplemental item.

14. The computer program product of claim 10, wherein generating the augmented reality element comprising the listing of the one or more supplemental items and, for each supplemental item of the one or more supplemental items, the selectable option associated with the corresponding supplemental item comprises generating the augmented reality element comprising the selectable option to display a set of directions to a location within the source associated with the corresponding supplemental item.

15. The computer program product of claim 14, wherein the computer-readable storage medium further has instructions encoded thereon that, when executed by the processor, cause the processor to perform steps comprising:

receiving a request to select the selectable option to display the set of directions to the location within the source associated with the corresponding supplemental item;

retrieving information describing a current location of the client device within the source;

retrieving information describing the location within the source associated with the corresponding supplemental item;

determining the set of directions from the current location of the client device within the source to the location within the source associated with the corresponding supplemental item;

generating an additional augmented reality element comprising the set of directions from the current location of the client device within the source to the location within the source associated with the corresponding supplemental item; and displaying the additional augmented reality element in the display area of the client device, wherein the augmented reality element is overlaid onto a portion of the display area.

16. The computer program product of claim 10, wherein generating the augmented reality element comprising the listing of the one or more supplemental items and, for each supplemental item of the one or more supplemental items, the selectable option associated with the corresponding supplemental item comprises generating the augmented reality element comprising the selectable option to add the corresponding supplemental item to a shopping list.

17. The computer program product of claim 16, wherein the computer-readable storage medium further has instructions encoded thereon that, when executed by the processor, cause the processor to perform steps comprising:

receiving a request to select the selectable option to add the corresponding supplemental item to the shopping list; and adding the corresponding supplemental item to the shopping list.

18. A computer system comprising:

a processor; and a non-transitory computer-readable storage medium storing instructions that, when executed by the processor, perform actions comprising:

receiving video data captured by a camera of a client device, wherein the video data depicts a field of view of a display area of the client device;

detecting a plurality of objects within the field of view of the display area of the client device based at least in part on the video data;

receiving depth data captured by a depth sensor of the client device, wherein the depth data describes a distance between each of the plurality of objects and the client device;

identifying a primary object from the plurality of objects based on the distances of the plurality of objects and the client device;

accessing item data for a plurality of items available at a source;

identifying the primary object as an item available at the source by:

generating a prompt for a multi-modal large language model, wherein the prompt comprises the video data, the depth data, information describing the primary object, the item data for the plurality of items, and instructions for the multi-modal large language model to identify the item based on the video data, the item data, the depth data, and the information describing the primary object;

transmitting the prompt to the multi-modal large language model; and receiving a response to the prompt from the multi-modal large language model, wherein the response identifies the primary object as the item available at the source;

selecting one or more supplemental items associated with the identified item based at least in part on a set of item data for the identified item and each supplemental item of the one or more supplemental items;

generating an augmented reality element comprising a listing of the one or more supplemental items and, for each supplemental item of the one or more supplemental items, one or more of: information associated with a corresponding supplemental item or a selectable option associated with the corresponding supplemental item; and displaying the augmented reality element in the display area of the client device, wherein the augmented reality element is overlaid onto a portion of the display area based at least in part on a location within the field of view of the display area at which the item is detected.

* * * * *